United States Patent
Tielemans et al.

(10) Patent No.: US 10,266,721 B2
(45) Date of Patent: Apr. 23, 2019

(54) RADIATION CURABLE AQUEOUS COMPOSITIONS WITH CONTROLLED POLYMER FLOW

(71) Applicant: Allnex Belgium S.A., Drogenbos (BE)

(72) Inventors: Michel Tielemans, Wemmel (BE); Jean-Yves Salviato, Les Bons Villers (BE); Jean-Noel Baurant, Dilbeek (BE)

(73) Assignee: ALLNEX BELGIUM S.A., Drogenbos (BE)

( * ) Notice: Subject to any disclaimer, the term of this patent is extended or adjusted under 35 U.S.C. 154(b) by 0 days.

(21) Appl. No.: 15/312,259

(22) PCT Filed: May 19, 2015

(86) PCT No.: PCT/EP2015/060998
§ 371 (c)(1),
(2) Date: Nov. 18, 2016

(87) PCT Pub. No.: WO2015/177151
PCT Pub. Date: Nov. 26, 2015

(65) Prior Publication Data
US 2017/0096582 A1 Apr. 6, 2017

(30) Foreign Application Priority Data
May 21, 2014 (EP) .................................. 14169199

(51) Int. Cl.
| | | |
|---|---|---|
| *C08G 18/73* | (2006.01) | |
| *C09D 175/00* | (2006.01) | |
| *C09D 175/16* | (2006.01) | |
| *C08G 18/67* | (2006.01) | |
| *C08G 18/81* | (2006.01) | |
| *C08G 18/08* | (2006.01) | |
| *C08G 18/22* | (2006.01) | |

(52) U.S. Cl.
CPC ....... *C09D 175/16* (2013.01); *C08G 18/0823* (2013.01); *C08G 18/227* (2013.01); *C08G 18/673* (2013.01); *C08G 18/73* (2013.01); *C08G 18/8175* (2013.01)

(58) Field of Classification Search
CPC .............. C08G 18/0823; C08G 18/227; C08G 18/673; C08G 18/73; C08G 18/8175; C08G 18/6725; C09D 175/16
See application file for complete search history.

(56) References Cited

U.S. PATENT DOCUMENTS

| | | | | |
|---|---|---|---|---|
| 8,853,318 B2* | 10/2014 | Tielemans | ........... | C08G 18/675 427/372.2 |
| 2008/0236449 A1* | 10/2008 | Yang | ................... | C08G 18/0823 106/287.11 |
| 2009/0270581 A1 | 10/2009 | Tielemans et al. | | |
| 2011/0086180 A1* | 4/2011 | Tielemans | ........... | C08G 18/675 427/487 |
| 2011/0112244 A1 | 5/2011 | Van Holen et al. | | |
| 2012/0136111 A1* | 5/2012 | Schwalm | ........... | C08G 18/0823 524/539 |

FOREIGN PATENT DOCUMENTS

WO 2013/135621 9/2013

OTHER PUBLICATIONS

International Search Report dated Aug. 28, 2015 in International Application No. PCT/EP2015/060998.

* cited by examiner

*Primary Examiner* — Michael L Leonard
(74) *Attorney, Agent, or Firm* — Wenderoth, Lind & Ponack, L.L.P.

(57) ABSTRACT

An aqueous radiation curable composition containing at least one ethylenically unsaturated polyurethane (A) and at least one ethylenically unsaturated polyurethane (B), different from the polyurethane (A), said ethylenically unsaturated polyurethane (B) preferably being characterized by a molecular weight that is below 10,000 Daltons; and optionally, at least one ethylenically unsaturated compound (C) different from (A) and (B); wherein the radiation curable composition in dry form has a steady-state creep viscosity $\eta_{30}$, expressed as the apparent viscosity after a deformation time of 30 minutes with a load $\sigma 0=50$ Pa at 23° C., that is above $1 \cdot 10^3$ Pa·s, more preferably above $1 \cdot 10^4$ Pa·s. The compositions are characterized by an improved creep viscosity $\eta_{30}$ and provide polymer materials with a good flow and mirror effect. In general, these materials are less sensitive to dust pick-up and fingerprints. Further provided is a one-vessel solvent free process for preparing such materials.

20 Claims, No Drawings

RADIATION CURABLE AQUEOUS COMPOSITIONS WITH CONTROLLED POLYMER FLOW

FIELD OF THE INVENTION

The present invention relates to radiation curable compositions based on ethylenically unsaturated polyurethanes with a controlled polymer flow, to their process of making and their uses.

BACKGROUND OF THE INVENTION

Water-based polymers for coating applications represent a growing market due to the increasing environmental and occupational health concerns associated with the use of solvents. In general, these waterborne polymers are built from high molecular weight polymers with a relatively high glass transition temperature, like is the case with vinyl and acrylic latexes obtained from emulsion polymerization that are widely used for indoor and outdoor paint & varnish applications. Due to the intrinsic characteristics required for the dispersed polymer, the minimum film formation temperature is usually above 20° C. and coalescing solvents, detrimental to the VOC content, have to be used to facilitate the application process. The resulting polymer flow after film formation typically provides a low to medium gloss coating. Although the gloss of the coating can easily be reduced to lower values with the use of an appropriate formulation (e.g. by adding colloidal silica), a very high gloss coating with good 'mirror effect' is extremely difficult to obtain with those aqueous polymers.

Ethylenically unsaturated polyurethane dispersions are characterized by a low mean particle size and a narrow particle size distribution associated with an excellent colloidal stability. They usually present low minimum film formation temperatures (MFFT). They are usually physically-drying and provide a dry-hard coating before curing, due to the presence of hard urethane and urea segments in the polymer. It is however possible to design specific polymers delivering a much higher polymer flow during film formation, that results in a very high gloss coating application with an excellent 'mirror effect', referred to as Distinctness-Of-Image (DOI) and a good 'coverage', referred to as 'body' or 'hiding power' in relation with the coating's ability to minimize the original surface roughness telegraphing. Such polymers can be obtained by balancing their molecular weight, their glass transition temperature ($T_g$) and their hydrophilic character (ionic or nonionic) in association with the presence of non-volatile reactive (polyacrylate) diluents. The antagonism between the good polymer flow required during the application process and the chemical & mechanical resistance required afterwards can be advantageously resolved by the energy-curing of the polymer, since the film formation and the radiation curing are taking place in two distinctive sequential steps during the application of the polymer dispersion. A high level of performance for these energy-cured coating compositions can typically be achieved through the heavy crosslinking density—including excellent adhesion and optical properties as well as superior mechanical & chemical resistance.

Despite the improvements offered by the above technology, it is further necessary to control the polymer flow during and after the film formation in order to avoid defects during the application. It can happen for instance that the polymer is being accumulated in a relatively thick layer around the spray guns or on the filters or other machine parts ensuring the recycling of the overspray. This unwished dry polymer bed, which can be swollen with some residual water, is then easily falling onto the substrates or into other machine parts. This creates defects and cleaning problems and affects the robustness and the productivity of the overall coating process. On top of that, the dry coating before cure is very tacky or even 'wet' which makes it sensitive to dust pick-up & finger prints and impose severe constraints in the manipulation of the coated objects (sticky edges). These coated materials cannot be stacked without serious precautions.

US 2009/270581 relates to an aqueous composition comprising an ethylenically unsaturated polyurethane pre-polymer (A). In Example 1, to this polyurethane (A) is added a second polyurethane (EBECRYL® 1290). The pre-polymer (A) has a high degree of unsaturation.

US 2011/0112244 discloses an aqueous composition comprising an ethylenically unsaturated polyurethane (A) comprising 0.2 meq/g of allophanate groups. Polyurethane (A) is obtained by a process wherein the polyisocyanate is used in excess to allow the formation of said allophanate groups by grafting of chains bearing free isocyanate groups on urethane linkages of other chains. In consequence of the grafting reaction, no other unsaturated polyurethane is formed in situ together with (A) in detectable amounts.

The compositions of the art lack a good balance of performances between optical properties, chemical resistance and mechanical properties.

There is a continuous demand for further improved water based polymer systems of which the dry polymer flow can be controlled, overcoming thereby some or all of the aforementioned problems.

DESCRIPTION OF THE INVENTION

Against this background we now provide an aqueous radiation curable composition (I) comprising:

at least one ethylenically unsaturated polyurethane (A) obtained from the reaction of at least one polyisocyanate compound (Ai); at least one ethylenically unsaturated compound (Aii) containing at least one reactive group capable to react with isocyanate groups; at least one hydrophilic compound (Aiii) containing at least one reactive group capable to react with isocyanate groups and at least one other group which is capable to render the polyurethane polymer dispersible in aqueous medium as such or after the formation of a salt; optionally, at least one polyol (Aiv); optionally, at least one further compound (Av) different from the polyol (Aiv) and comprising at least one reactive group capable to react with isocyanate groups; and optionally, at least one reactive electrophilic compound (Avi); said ethylenically unsaturated polyurethane (A) preferably being characterized by a molecular weight that is above 1,000 Daltons;

at least one ethylenically unsaturated polyurethane (B), different from the polyurethane (A), obtained from the reaction of at least one polyisocyanate compound (Bi); at least one ethylenically unsaturated compound (Bii) containing at least one reactive group capable to react with isocyanate groups; optionally, at least one polyol (Biv); optionally, at least one further compound (Bv) different from the polyol (Biv) and comprising at least one reactive group capable to react with isocyanate groups; and optionally, at least one reactive electrophilic compound (Bvi); said ethylenically unsaturated polyurethane (B) preferably being characterized by a molecular weight that is below 10,000 Daltons; and optionally, at least one ethylenically unsaturated compound (C) different from (A) and (B);

wherein the radiation curable composition (I) in dry form has a steady-state creep viscosity $\eta_{30}$, expressed as the apparent viscosity after a deformation time of 30 minutes with a load $\sigma 0=50$ Pa at 23° C., that is above $1 \cdot 10^3$ Pa·s.

When polyols (Aiv) and/or (Biv) are used, (Aiv) are preferably saturated polyols whereas (Biv) can be saturated polyols and/or unsaturated polyols.

By saturated polyols is meant polyols that do not comprise carbon-carbon double bonds which under the influence of irradiation and/or a (photo)initiator can undergo radical polymerization. Such compounds may comprise aromatic groups as it is generally known that carbon carbon double bonds contained in aromatic rings are inert under these conditions.

By unsaturated polyols is meant polyols that comprise carbon-carbon double bonds which under the influence of irradiation and/or a (photo)initiator can undergo radical polymerization. The carbon-carbon double bonds are generally chosen from (meth)acrylic and/or allylic groups, preferably they are (meth)acrylic groups, most preferably acrylic groups. In the present invention, the term "(meth)acryl" is to be understood as to encompass both acryl and methacryl compounds or derivatives as well as mixtures thereof. Preferred are often acrylated compounds.

An advantage of the radiation-curable compositions (I) of the invention with a controlled creep value (steady-state creep viscosity $\eta_{30}$) compared to existing products is that they require the use of only limited amounts of reactive diluents to achieve an acceptable flow compatible with the application.

In the present invention, the steady-state creep viscosity $\eta_{30}$ is measured according to the following method. In order to simulate the flow behaviour of a droplet of resin subjected to gravitational stress, the creep properties of the dry polymer are determined after evaporation of water and before UV-curing using a rotational rheometer. An estimate of the stress acting on a droplet with a diameter d≈5 mm under normal gravity is provided by $g(\rho_{resin}-\rho_{air})d \approx 50$ Pa where g≈9.81 m/s$^2$ is the gravitational acceleration and where $\rho_{resin} \approx 1$ g/cm$^3$ and $\rho_{air} \approx 1$ mg/cm$^3$ are the specific gravity for the resin and air, respectively. The dry polymer is obtained by casting the liquid dispersion (I) in an aluminum cup and by evaporation of the water at room temperature for 72 h followed by a heat treatment at 50° C. for 24 h in a convection oven. After this thorough drying procedure, the polymer layer has a thickness between 500 and 800 µm. Usually, the bottom of the aluminum cup is covered with a release paper (Loparex Poly Slik 111/120) for easy removal of the dry polymer from the cup. The dry polymer is cut as a circular sample with a diameter of 25 mm. The creep properties are measured using a MCR300 rheometer of Anton Paar fitted with a parallel plate system with a diameter II=25 mm and a Peltier temperature control. After loading the circular polymer sample between the plates, the gap is fixed at ≈500 µm using a normal force not exceeding 1N. Prior to the actual creep test an oscillatory pre-shear step of 1 min is applied at a frequency ω=0.1 Hz followed by a rest period of 2 min. The creep test is then conducted by applying a constant shear stress of σ=50 Pa over a period of 30 min while recording the shear deformation γ of the sample. After 30 min the steady-state creep viscosity is calculated from the time derivative of the shear deformation as $\eta_{30}=\sigma/(d\gamma/dt)$.

Typically the radiation curable composition (I) of the invention has a steady-state creep viscosity $\eta_{30}$ at 23° C. as defined above that is above $1 \cdot 10^3$ Pa·s.

Preferably however the radiation curable composition (I) of the invention has a steady-state creep viscosity $\eta_{30}$ at 23° C. as defined above that is above $5 \cdot 10^3$ Pa·s, preferably above $1 \cdot 10^4$ Pa·s, more preferably above $1 \cdot 10^5$ Pa·s, even more preferably above $1 \cdot 10^6$ Pa·s. In some embodiments this steady-state creep viscosity $\eta_{30}$ can be above $1 \cdot 10^7$ Pa·s, even above $1 \cdot 10^8$ Pa·s.

In general the radiation curable composition (I) of the invention has a steady-state creep viscosity $\eta_{30}$ at 23° C. as defined above of between $1 \cdot 10^3$ Pa·s and $1 \cdot 10^8$ Pa·s, more preferably of between $1 \cdot 10^4$ Pa·s and $1 \cdot 10^7$ Pa·s. In one embodiment of the invention, the radiation curable composition (I) of the invention has a steady-state creep viscosity $\eta_{30}$ at 23° C. of between $1 \cdot 10^4$ Pa·s and $5 \cdot 10^6$ Pa·s. In another embodiment of the invention, the radiation curable composition (I) of the invention has a steady-state creep viscosity $\eta_{30}$ at 23° C. of at least $1 \cdot 10^3$ Pa·s.

When the steady-state creep viscosity $\eta_{30}$ at 23° C. as defined above is below $1 \cdot 10^3$ Pa·s, the polymer flow in some cases can start giving problems during the application process (see introduction). Said problems are e.g. easy falling of overspray onto substrates or machine which creates coating defects and cleaning problems; high sensitivity to dust picking and finger print; severe constraints in the manipulation of the coated objects due to sticky edges. When the steady-state creep viscosity $\eta_{30}$ at 23° C. as defined above is above $1 \cdot 10^9$ Pa·s, the polymer flow can be reduced in such a way that no measurement can be obtained anymore in the reported testing conditions. The coating then becomes gradually less suitable to display the high gloss attributes (like a mirror effect and/or hiding power) disclosed in this invention.

By an "ethylenically unsaturated" compound is meant to designate a compound comprising at least one polymerizable ethylenically unsaturated group. By polymerizable "ethylenically unsaturated" groups is meant to designate in the present invention carbon-carbon double bonds which under the influence of irradiation and/or a (photo)initiator can undergo radical polymerization. The polymerizable ethylenically unsaturated groups are generally chosen from (meth)acrylic and/or allylic groups, preferably they are (meth)acrylic groups, most preferably acrylic groups. In the present invention, the term "(meth)acryl" is to be understood as to encompass both acryl and methacryl compounds or derivatives as well as mixtures thereof. Preferred are often acrylated compounds.

By a "reactive electrophilic compound" is meant to designate a compound that comprises at least one electrophilic reactive group capable to be incorporated into or grafted onto the polyurethane polymers (A) and/or (B). Preferably the reactive electrophilic compound (vi) is grafted onto the polyurethane polymers (A) and/or (B) by reacting with nucleophilic sites present thereon, like for instance the urethane or urea functions present in the polymer backbone, or the carboxylic acid group provided by the compound (Aiii) capable to render the polyurethane polymer (A) dispersible in an aqueous medium (typically water). Examples of electrophilic reactive groups are isocyanate groups, epoxy groups, aziridine groups, at least one carbodiimide group and/or oxetane groups. Other examples of electrophilic reactive groups are aminoplasts or amino crosslinking resins in which urea formaldehyde or melamine formaldehyde are the most commonly used (e.g. CYMEL® series from Cytec). This group also covers formaldehyde resins based on other backbones like e.g. glycoluryl, benzoguanimine or non-formaldehyde based crosslinkers like e.g. dihydroxyethyleneurea glyoxal. Preferred are isocyanate groups and epoxy groups.

The ethylenically unsaturated polyurethane (A) typically is a water dispersible polymerizable ethylenically unsaturated polyurethane (A) obtained from the reaction of at least one polyisocyanate compound (Ai); at least one ethylenically unsaturated compound (Aii) containing at least one reactive group capable to react with isocyanate groups; at least one hydrophilic compound (Aiii) containing at least one reactive group capable to react with isocyanate groups and at least one other group which is capable to render the polyurethane polymer dispersible in aqueous medium as such or after the formation of a salt; optionally, at least one polyol (Aiv); optionally, at least one further compound (Av) different from the polyol (Aiv) and comprising at least one reactive group capable to react with isocyanate groups; and optionally, at least one reactive electrophilic compound (Avi).

The ethylenically unsaturated compound (A) preferably is obtained from the reaction of: from 10 to 50 wt % (weight %) of at least one polyisocyanate (Ai), from 10 to 90 wt % of at least one polymerizable ethylenically unsaturated compound (Aii) containing at least one reactive group capable to react with isocyanate groups, from 1 to 15 wt % of at least one hydrophilic compound (Aii) containing at least one reactive group capable to react with isocyanate groups and at least one group which is capable to render the polyurethane dispersible in aqueous medium either directly or after a reaction with a neutralizing agent to provide a salt, from 0 to 40 wt % of at least one polyol (Aiv), from 0 to 20 wt % of at least one further compound (Av) different from the polyol (Aiv) and comprising at least one reactive group capable to react with isocyanate groups, and from 0 to 20 wt % of at least one reactive electrophilic compound (Avi). Weight percentages are herein relative to the total weight of the polyurethane (A).

Advantageously, in the invention, the compounds (Ai) to (Avi) all differ from each other.

Advantageously, in the invention, the sum of the weight percentages of compounds (Ai)+(Aii)+(Aiii)+(Aiv)+(Av)+(Avi) equals 100%.

In general, compounds (Ai) are used in amounts of at least 10 wt %, typically at least 15 wt %, more typically at least 20 wt %, preferably at least 25 wt %, relative to the total weight of compounds (A). In general they are used in an amount of at most 50 wt %, usually at most 40 wt %, often at most 35 wt % and most often at most 30 wt %, relative to the total weight of compounds (A).

In general, compounds (Aii) are used in amounts of at least 10 wt %, typically at least 20 wt %, more typically at least 30 wt %, preferably at least 40 wt %, most preferably at least 50 wt % relative to the total weight of compounds (A). In general they are used in an amount of at most 90 wt %, usually at most 80 wt %, often at most 70 wt %, and most often at most 60 wt %, relative to the total weight of compounds (A).

In general, compounds (Aiii) are used in amounts of at least 1 wt %, typically at least 5 wt %, more typically at least 6 wt %, preferably at least 7 wt %, relative to the total weight of compounds (A). In general they are used in an amount of at most 15 wt %, usually at most 12 wt %, often at most 11 wt %, and most often at most 10 wt %, relative to the total weight of compounds (A).

In general, compounds (Aiv) are used in amounts of at most 40 wt %, typically at most 30 wt %, more typically at most 20 wt %, preferably at most 10 wt %, relative to the total weight of compounds (A). When used, they typically are used in an amount of at least 1 wt %, more in particular at least 2.5 wt %, preferably at least 5 wt %, relative to the total weight of compounds (A). Most typically compounds (Aiv) are saturated polyols.

In general, compounds (Av) are used in amounts of at most 20 wt %, typically at most 15 wt %, more typically at most 10 wt %, preferably at most 5 wt %, relative to the total weight of compounds (A). When used, they typically are used in an amount of at least 0.25 wt %, more in particular at least 0.5 wt %, preferably at least 1 wt %, relative to the total weight of compounds (A).

In general, compounds (Avi) are used in amounts of at most 20 wt %, typically at most 15 wt %, more typically at most 10 wt %, preferably at most 5 wt %, relative to the total weight of compounds (A). When used, they typically are used in an amount of at least 0.25 wt %, more in particular at least 0.5 wt %, preferably at least 1 wt %, relative to the total weight of compounds (A).

In an embodiment of the invention the sum of the weight percentages of the compounds (Ai) to (Aiii) equals at least 90%, more preferably at least 95%, and most preferably this sum equals 100%.

Typically polyurethanes (A) of the invention are characterized by a weight average molecular weight (Mw) of at least 1,000 Daltons. Typically the Mw is at least 2,500, more typically at least 5,000, usually at least 7,500 and in general at least 10,000 Daltons. Usually this Mw is at most 50,000, often at most 30,000, typically at most 25,000 and most typically at most 20,000 Daltons. Preferred are compounds (A) with a Mw between 2,500 and 20,000, preferably between 5,000 and 20,000 Daltons.

Preferably the number average molecular weight (Mn) of the polyurethane is between 1,500 and 3,500 Daltons. Preferably the polydispersity index Mw/Mn is between 1 and 10, most preferably between 2 and 5. The number-average molecular weight (Mn), the weight-average molecular weight (Mw) and polydispersity are determined by conventional gel permeation chromatography (GPC) with polystyrene standards EasyCal from Polymer Laboratories (Molecular Weight range: 200-400.000 g/mol). A small portion of sample is dissolved in tetrahydrofuran (THF) and injected into a liquid chromatograph (Merck-Hitachi L7100) equipped with 3 PLGel Mixed-D LS polystyrene divinylbenzene GPC columns (300 mm×7.5 mm×51 µm). The components of the sample are separated by the GPC columns based on their molecular size in solution and detected by a Refractive Index detector. Data were gathered and processed by Polymer Laboratories Cirrus GPC software.

Typically polyurethanes (A) of the invention are characterized by a double bond equivalent (number of milliequivalents of ethylenic double bonds per g of solid) of from 0.5 to 7 meq/g, preferably of from 1 to 6 meq/g. More typically the double bond equivalent is from 2 to 5 meq/g, and preferably from 3 to 4 meq/g.

The amount of (meth)acrylated and ethylenically unsaturated groups is usually measured by nuclear magnetic resonance spectroscopy and is expressed in meq per g of solid material. A sample of the composition is dissolved in a deuterated solvent (e.g. DMSO-d6). The sample is then submitted to quantitative 1H-NMR analysis in order to measure the molar concentration of (meth)acrylated and ethylenically unsaturated groups using 1,3,5-bromobenzene as internal standard. The comparison of the signal from the aromatic protons of the internal standard and the signals assigned to the (meth)acrylated and ethylenically double bonds allows to calculate the molar concentration (meth) acrylated and ethylenically unsaturated groups according to the formula (A×B)/C, wherein A is the integration of 1H signals from double bonds in the sample, B is the number of moles of internal standard and C is the integration of aromatic 1H signal from 1,3,5-bromobenzene.

Alternatively, the amount of (meth)acrylated and ethylenically unsaturated groups can also be measured by a titration method following the Aza-Michael addition of morpholine on said unsaturated groups (N-methylpyrrolidone as solvent and excess morpholine is reacted away with acetic anhydride). The formed tertiary amine is consecutively titrated with HCl. The result needs to be corrected with the measured basicity of the sample (blank material in meq per g solid). The result is also expressed in meq per g of solid material.

The ethylenically unsaturated polyurethane (B), different from the polyurethane (A), advantageously is a non self-dispersible compound that typically is obtained from the reaction of at least one polyisocyanate compound (Bi); at least one ethylenically unsaturated compound (Bii) containing at least one reactive group capable to react with isocyanate groups; optionally, at least one polyol (Biv); optionally, at least one further compound (Bv) different from the polyol (Biv) and comprising at least one reactive group capable to react with isocyanate groups; and optionally, at least one reactive electrophilic compound (Bvi).

By a "non self-dispersible compound" is meant that the compound in itself is not self-dispersible in water as a stable emulsion or dispersion. By "stable" is meant that the emulsion or dispersion is passing 6 months at ambient temperature or 10 days at 60° C. without significant changes in the physico-chemical characteristics of the product including the absence of sedimentation, creaming or any such type of phase separation. Typically compounds (B) are also not soluble in water.

This polyurethane (B) typically is obtained from the reaction of: from 2.5 to 45 wt % of at least one polyisocyanate compound (Bi); from 55 to 97.5 wt % of at least one ethylenically unsaturated compound (Bii) containing at least one reactive group capable to react with isocyanate groups; from 0 to 80 wt % of at least one polyol (Biv); from 0 to 20 wt % of at least one further compound (Bv) different from the polyol (Biv) and comprising at least one reactive group capable to react with isocyanate groups; and from 0 to 20 wt % of at least one reactive electrophilic compound (Bvi).

Advantageously, in the invention, the compounds (Bi), (Bii), (Biv), (Bv) and (Bvi) all differ from each other.

Advantageously, in the invention, the sum of the weight percentages of compounds (Bi)+(Bii)+(Biv)+(Bv)+(Bvi) equals 100%.

In an embodiment of the invention, compounds (Ai) and (Bi) are the same though they can also be different. In the same or another embodiment of the invention, compounds (Aii) and (Bii) are the same though they can also be different. In the same or another embodiment of the invention, compounds (Aiv) and (Biv) are the same though they can also be different. In the same or another embodiment of the invention, compounds (Av) and (Bv) are the same though they can also be different. In the same or another embodiment of the invention, compounds (Avi) and (Bvi) are the same though they can also be different.

In general, compounds (Bi) are used in amounts of at least 2.5 wt %, typically at least 5 wt %, more typically at least 10 wt %, preferably at least 15 wt %, relative to the total weight of compounds (B). In general they are used in an amount of at most 45 wt %, usually at most 40 wt %, often at most 30 wt % and most often at most 25 wt %, relative to the total weight of compounds (B).

In general, compounds (Bii) are used in amounts of at least 55 wt %, typically at least 60 wt %, more typically at least 70 wt %, preferably at least 80 wt %, relative to the total weight of compounds (B). In general they are used in an amount of at most 97.5 wt %, usually at most 95 wt %, often at most 90 wt %, and most often at most 85 wt %, relative to the total weight of compounds (B).

In general, compounds (Biv) are used in amounts of at most 80 wt %, typically at most 60 wt %, more typically at most 40 wt %, preferably at most 20 wt %, relative to the total weight of compounds (B). When used, they typically are used in an amount of at least 1 wt %, more in particular at least 5 wt %, preferably at least 10 wt %, relative to the total weight of compounds (B). Compounds (Biv) can be selected from saturated polyols and/or from unsaturated polyols. Often though they are saturated polyols and typically they are the same as the polyols (Aiv).

In general, compounds (Bv) are used in amounts of at most 20 wt %, typically at most 15 wt %, more typically at most 10 wt %, preferably at most 5 wt %, relative to the total weight of compounds (B). When used, they typically are used in an amount of at least 0.25 wt %, more in particular at least 0.5 wt %, preferably at least 1 wt %, relative to the total weight of compounds (B).

In general, compounds (Bvi) are used in amounts of at most 20 wt %, typically at most 15 wt %, more typically at most 10 wt %, preferably at most 5 wt %, relative to the total weight of compounds (B). When used, they typically are used in an amount of at least 0.25 wt %, more in particular at least 0.5 wt %, preferably at least 1 wt %, relative to the total weight of compounds (B).

In an embodiment of the invention the sum of the weight percentages of the compounds (Bi) to (Bii) equals at least 90%, more preferably at least 95%, and most preferably this sum equals 100%.

Typically polyurethanes (B) of the invention are characterized by a molecular weight (MW) that is below 10,000 Daltons. Usually the MW is below 5,000, more often is below 3,000, typically below 2,500 and most typically below 2,000 Daltons. These are molecular weights as calculated on the basis of the theoretical target structure or the synthesis stoichiometry.

Typically polyurethanes (B) of the invention are characterized by a double bond equivalent (number of milliequivalents of ethylenic double bonds per g of solid) of from 1 to 8 meq/g, preferably of from 2 to 7 meq/g. More typically the double bond equivalent is from 3 to 6 meq/g, and preferably from 4 to 5 meq/g.

The composition (I) of the invention, optionally, may further comprise one or more ethylenically unsaturated compounds (C) different from the polyurethanes (A) and (B). Compounds (C) most typically are (meth)acrylated compounds, acrylates being preferred. Preferably compounds (C) are selected from one or more of: polyester (meth)acrylates; polycarbonate (meth)acrylates, polyether (meth)acrylates, polyepoxy (meth)acrylates, poly(meth)acrylic (meth)acrylates, polysiloxane (meth)acrylates and the like. Acrylated compounds are herein preferred. These compounds are well known in the art and have been described in detail in e.g. WO2013/135621. Most typically compounds (C) are polyester (meth)acrylates, more in particular they are polyester acrylates.

Typically also compounds (C) are not self-dispersible. Though they can be soluble in water, compounds that are not soluble in water are often preferred.

Typically compounds (C) of the invention are characterized by a molecular weight (MW) that is below 2,500 Daltons. Usually the MW is below 2,000, typically below 1,500 and most typically below 1,000 Daltons. These are molecular weights as calculated on the basis of the theoretical target structure or the synthesis stoichiometry.

Typically compounds (C) of the invention are characterized by a double bond equivalent (number of milli-equivalents of ethylenic double bonds per g of solid) of from 3 to 12 meq/g, more typically of from 3 to 10 meq/g, preferably of from 4 to 9 meq/g. More typically the double bond equivalent is from 5 to 8 meq/g, and preferably from 6 to 7 meq/g.

The radiation curable compositions (I) of the invention (any of the above) can be prepared in various ways. They can be prepared according to a process that comprises the steps of preparing compounds (A), (B) and (C) separately, followed by a step of blending these compounds and subsequent dispersion in water. Alternatively, they may be prepared by providing each of compounds (A), (B) and (C) in an aqueous medium (typically in water), followed by blending of these compounds. Compounds (B) and (C) are then typically provided under the form of an emulsion in water containing a suitable external emulsifier to stabilize the emulsion. Any state-of-the-art emulsifier can be used for that purpose including but not limited to the amphiphilic ionic or non-ionic molecules with a marked tensio-active character.

Radiation curable compositions (I) of the invention, however, preferably are prepared according to a process that comprises:

- a first step comprising the reaction of at least one compound (Ai) with at least one compound (Aii) in such a stoichiometry that there is an excess of isocyanate groups over the reactive groups capable to react with isocyanate groups and that a mixture of an ethylenically unsaturated polyurethane (B) is formed in situ together with a isocyanate-containing precursor of the ethylenically unsaturated polyurethane (A);
- a second step comprising the reaction of the isocyanate-containing precursor obtained in step 1 with at least one compound (Aiii) and, optionally, at least one polyol (Aiv) and/or at least one compound (Av) in such a stoichiometry that there is still an optional excess of isocyanate groups;
- an optional third step comprising the conversion of the optional excess of isocyanate groups from step 2 into allophanates and/or biurets;
- an optional fourth step comprising the reaction of the polyurethane thus obtained with at least one compound (Avi);
- an optional fifth step comprising the reaction with a neutralizing agent in order to convert at least part of the hydrophilic groups provided by compound (Aiii) into ionic salts;
- a sixth step comprising the dispersion in an aqueous medium (typically water) of the polyurethane thus obtained; and
- an optional further step comprising the reaction of the polyurethane thus obtained with at least one compound (Av).

Generally, when polyol (Aiv) is used, (Aiv) is preferably a saturated polyol.

This process advantageously is a solvent-free process, more in particular a one-vessel solvent-free process.

Though the optional compounds (Avi) preferably are added in the fourth step described above, it is also possible to add these compounds at other moments like for instance during the second step as long as the nucleophilic and electrophilic compounds are added in sequential steps.

In said embodiment, compounds (Ai) and (Bi) are the same, compounds (Aii) and (Bii) are the same, optional compounds (Aiv) and (Biv) are the same, optional compounds (Av) and (Bv) are the same, and optional compounds (Avi) and (Bvi) are the same.

When compounds (C) are added in this process then most typically they are added prior to dispersion in water. Compounds (C) for instance can be added in any of steps 1 to 4. Most typically they are added in step 1.

This process can be carried out by reacting a stoichiometric excess of compounds (Ai) with compounds (Aii), (Aiii), and where present (Aiv) and/or (Av), preferably under substantially anhydrous conditions and at a temperature between 30° C. and 130° C., more preferably between 50° C. and 100° C., until the reaction between the isocyanate groups and the isocyanate-reactive groups is substantially complete. The isocyanate content can be followed by titration with an amine over the whole reaction.

The reactants are generally used in proportions corresponding to an equivalent ratio of isocyanate groups provided by compounds (Ai) to isocyanate-reactive groups provided by compounds (Aii), (Aiii) and optionally compounds (Aiv) and/or (Av), of from about 1:1 to about 2:1, preferably from about 1.1:1 to about 1.5:1, most preferably from about 1.2:1 to 1.4:1. The reaction may be facilitated by the addition of from 5 to 50 wt %, preferably from 15 to 30 wt % of a solvent in order to reduce the viscosity of the prepolymer. A suitable solvent is acetone and/or methylethylketone. An advantage of the invention, however, is that compositions (I) of the invention can be prepared according to a solvent-free process. During the process of the invention, it is common to use catalysts to accelerate the reaction of the isocyanates towards the isocyanate reactive groups (typically hydroxyl groups) and to use inhibitors in order to prevent the radical reaction of the reactive unsaturations. It is possible in the frame of this invention to use a sequential process during which compounds (Ai), (Aii), (Aiii), (Aiv) and/or (Av) are added incrementally in two or several portions, or with a continuous feed. The reason for this is a better control on the exothermicity of the reaction, especially when no solvent is present. It is also possible in the frame of this invention to use a one-step process where all the constituents are added simultaneously.

The compounds (Ai) and (Aii) are typically used in an equivalent ratio of about 1:0.75 to 1:0.50, more preferably of about 1:0.70 to 1:0.50, even more preferably about 1:0.65 to 1:0.50, most preferably of about 1:0.60 to 1:0.50 and the most preferably of about 1:0.55 to 1:0.50.

The compounds (Ai), (Aii), and (Aiii) are preferably used in an equivalent ratio [(Ai)+(Aii)]:(Aiii) of from 1:0.5 to 1:1, more preferably from 1:0.6 to 1:1, even more preferably 1:0.7 to 1:1, most preferably from 1:0.8 to 1:1.

The compounds (Ai), (Aii), (Aiii) and (Aiv) are preferably used in an equivalent ratio [(Ai)+(Aii)+(Aiii)]:(Aiv) of from 1:0 to 1:1. When compounds (Aiv) are used this ratio preferably is from 1:0.25 to 1:1, more preferably from 1:0.5 to 1:1, and most preferably from 1:0.75 to 1:1.

The optional third step and fourth step preferably take place at high temperature, usually from 80 to 130° C., preferably from 90 to 110° C. until the residual isocyanate content is lower than 0.5 meq/g, preferably lower than 0.1 meq/g unless the compound (Av) is used in a later step.

If desired, before dispersion in aqueous medium the polyurethane obtained in the previous steps can be further reacted with at least one compound (Avi). In that case, it is preferred that the residual isocyanate content of the polyurethane is lower than 0.5 meq/g, preferably lower than 0.1 meq/g, most preferably lower than 0.05 meq/g.

In general, the prepolymer obtained after the reaction of (Ai), (Aii), (Aiii), and, optionally (Aiv), (Av) and/or (Avi), is dispersed in an aqueous medium by adding the prepolymer slowly into water or reversely by adding water to the prepolymer. Usually this dispersion proceeds under high shear mixing. Usually the dispersion requires the preliminary neutralization of the hydrophilic groups provided by compound (Aiii), such as the carboxylic acid, sulfonic acid or phosphonic acid groups, into salts. This is generally done by adding an organic or inorganic neutralizing agent, or mixtures thereof, to the prepolymer or to the water. Suitable neutralizing agents include volatile organic tertiary amines such as trimethylamine, triethylamine, triisopropylamine, tributylamine, N,N-di(m)ethylcyclohexylamine, N,N-di(m) ethylaniline, N-(m)ethylmorpholine, N-methylpiperazine, N-methylpyrrolidine and N-methylpiperidine, 2-dimethylaminoethanol, 2-diethylaminoethanol, 2-dipropylaminoethanol, 2-dibutylaminoethanol and non-volatile inorganic bases comprising monovalent metal cations, preferably alkali metals such as lithium, sodium and potassium and anions such as hydroxides, carbonates and bicarbonates.

The total amount of these neutralizing agents can be calculated according to the total amount of acid groups to be neutralized. Generally a stoichiometric ratio between carboxylic acid and neutralizing agent is between 1:0.5 to 1:1.

The isocyanate functional prepolymer fraction can be chain-extended by reacting it further with at least one compound (Av) having at least two isocyanate reactive groups (typically amine groups), generally in the aqueous phase, preferably at a temperature between 5 and 90° C., more preferably of 10 to 30° C. and most preferably of 15 to 20° C. The total amount of such compounds (Av) used is generally calculated according to the amount of residual isocyanate groups present in the polyurethane prepolymer. The equivalent ratio of isocyanate groups in the prepolymer to the active hydrogen groups in compounds (Av) during the chain extension is generally in the range of from about 1:0.7 to about 1:1.3, preferably from about 1:0.9 to about 1:1 on an equivalent basis. This ratio is more preferably 1:1 in order to obtain a fully reacted polyurethane polymer with no residual free isocyanate groups.

In general, after the formation of the dispersion of the polyurethane and when it contains a volatile solvent with a boiling point of below 100° C., the polymer dispersion is stripped. This is usually done under reduced pressure and at a temperature between 20 and 90° C., preferably 40 to 60° C. Typical solvents with a low boiling point that can be used for making polyurethane dispersions are acetone and methylethylketone. Typical solvents with a high boiling point that can be used for making polyurethane dispersions are N-methylpyrrolidone and N-ethylpyrrolidone; other suitable oxygenated solvents are including not limitatively ethylene carbonate and propylene carbonate, ethyl-3-ethoxypropionate (Ektapro® EEP, Eastman), 2,2,4-trimethyl-1,3-pentanedioldiisobutirate (Kodaflex® TXBI, Eastman), propyleneglycol diacetate (DOWANOL® PGDA), and dipropylene glycol dimethyl ether (PROGLYDE® DMM). Bio-solvents can also be used like for instance ethyl lactate or di(m)ethyl succinate.

During this process, it is common to use catalysts to accelerate the reaction and to drive the selectivity of isocyanates towards polyurethanes and/or polyureas with optional allophanates and biurets. Typical catalysts include organometallic compounds or salts derived from tin, bismuth, zirconium, zinc, copper or the like. Particularly preferred are bismuth octoate and bismuth neodecanoate.

During this process, it is also common to use radical inhibitors in order to prevent the radical reaction of the reactive (meth)acrylic functionality especially when conducted above room temperature. Some suitable inhibitors are hydroquinone, hydroquinone monomethylether or 2,6-di-tert-butyl-4-methylphenol that are active in the presence of oxygen. In some cases, products like triphenylphosphite, trisnonylphenylphosphite, phenothiazine or the like can also be used, as well as mixtures therefrom.

In a preferred embodiment of the invention, in the first step of this process the equivalent ratio of isocyanate-reactive groups provided by compounds (Aii) to isocyanate groups provided by compounds (Ai) is above 50%, more in particular above 51%. Preferred are ratios above 52%, even more preferred are ratios above 53%. The most preferred ratios are above 54% and even above 55%. This ratio is at most 99%, but typically is at most 75%, more typically at most 60%. The isocyanate reactive groups of compounds (Aii) usually are hydroxyl groups.

By applying such ratios, compounds (B) are induced in situ, compounds that were found to have a positive effect for controlling the flow of the radiation curable compositions (I) of the invention.

The compounds (Bi) and (Bii) are preferably used in an equivalent ratio of about 1:0.1 to 1:2, more preferably of about 1:0.5 to 1:2, even more preferably about 1:1 to 1:2 and most preferably of about 1:1.5 to 1:2.

The compounds (Bi), (Biv) and (Bv) are preferably used in an equivalent ratio [(Bi)/(Biv)+(Bv)] of from 1:0.8 to 1:1, more preferably from 1:0.50 to 1:0, most preferably from 1:0.25 to 1:0. Most typically however this ratio is about 1:0.

By polyisocyanate compounds (Ai) and (Bi) are meant to designate organic compounds comprising at least two isocyanate groups. The polyisocyanate compound usually comprises not more than three isocyanate groups. The polyisocyanate compound is most preferably a diisocyanate.

The polyisocyanate compound is generally selected from aliphatic, cycloaliphatic, aromatic and/or heterocyclic polyisocyanates or combinations thereof.

Examples of aliphatic and cycloaliphatic polyisocyanates are 1,6-diisocyanatohexane (HDI), 1,1'-methylene bis[4-isocyanatocyclohexane] (H12MDI), 5-isocyanato-1-isocyanatomethyl-1,3,3-trimethyl-cyclohexane (isophorone diisocyanate, IPDI). Aliphatic polyisocyanates containing more than two isocyanate groups are for example derivatives of above mentioned diisocyanates like 1,6-diisocyanatohexane biuret and isocyanurate (resp. Desnnodur® N75BA and Desnnodur® N3390BA).

Examples of aromatic polyisocyanates are 1,4-diisocyanatobenzene (BDI), 2,4-diisocyanatotoluene (TDI), 1,1'-methylenebis[4-isocyanatobenzene] (MDI), xylilene diisocyanate (XDI), tetramethylxylilene diisocyanate (TMXDI), 1,5-naphtalene diisocyanate (NDI), tolidine diisocyanate (TODI) and p-phenylene diisocyanate (PPDI).

The polyisocyanate is preferably selected from aliphatic and cycloaliphatic polyisocyanates, more preferably diisocyanates. Especially preferred are 1,6-diisocyanatohexane (HDI) and/or 5-isocyanato-1-isocyanatomethyl-1,3,3-trimethyl-cyclohexane (IPDI).

By ethylenically unsaturated compounds (Aii) and (Bii) containing at least one reactive group capable to react with isocyanate groups is meant to designate in the present invention compounds comprising at least one ethylenically unsaturated function such as a (meth)acrylic group and at least one nucleophilic function capable of reacting with isocyanate, preferably an hydroxyl group.

Preferred are (meth)acryloyl mono-hydroxy compounds, more particularly poly(meth)acryloyl mono-hydroxy compounds. Acrylates are particularly preferred.

Useful compounds (ii) in this category include the esterification products of aliphatic and aromatic polyols with (meth)acrylic acid having a residual average hydroxyl functionality of about 1. The partial esterification products of (meth)acrylic acid with di-, tri-, tetra-, penta- or hexahydric polyols or mixtures thereof are preferred. In this context, it is also possible to use reaction products of such polyols with ethylene oxide and/or propylene oxide or mixtures thereof, or reaction products of such polyols with lactones and lactides, which add to these polyols in a ring-opening reaction. Examples of suitable lactones are γ-butyrolactone and, in particular ε-caprolactone and δ-valerolactone. These modified or unmodified polyols are partly esterified with acrylic acid, methacrylic acid or mixtures thereof until the desired residual hydroxyl functionality is reached. Alternatively these products can be obtained by transesterification of the polyols with (meth)acrylic esters. It is known to the person skilled in the art that the (trans)esterification of polyols typically brings a mixture of (meth)acrylated components that can advantageously be characterized by the hydroxyl number (IOH) expressed in mg KOH/g.

In some cases it can be beneficial to use such a mixture of compounds (ii) resulting from the acrylation of the polyols. In a wider definition, compounds (ii) typically are selected from one or more of polyester (meth)acrylates, polyether (meth)acrylates, polyether-ester (meth)acrylates and polyepoxy (meth)acrylates having an hydroxyl number (IOH) in the range of from 15 to 300 mg KOH/g.

Preferred molecules in this category are (meth)acrylic esters with linear and branched polyols in which at least one hydroxy functionality remains free, like hydroxyalkyl(meth)acrylates having 1 to 20 carbon atoms in the alkyl group, and in particular hydroxyethyl (meth)acrylate, hydroxypropyl (meth)acrylate and/or hydroxybutyl (meth)acrylate. Particularly preferred are acrylation compositions comprising a major hydroxylated component with at least two (meth)acryl functions such as glycerol diacrylate, trimethylolpropane diacrylate, pentaerythritol triacrylate, ditrimethylolpropane triacrylate, dipentaerythritol pentaacrylate and their (poly) ethoxylated and/or (poly)propoxylated equivalents. Compounds (ii) obtained from the reaction of (meth)acrylic acid with aliphatic, cycloaliphatic or aromatic compounds bearing an epoxy functionality together with at least one (meth)acrylic functionality can be used as well. An example is the reaction between (meth)acrylic acid and the glycidyl ester of versatic acid (Cardura®E10). Another example is the reaction between (meth)acrylic acid and glycidyl methacrylate. Additional compounds in this category are those obtained from the reaction of diglycidyl compounds with (meth) acrylic acid, like is the case with the reaction between bisphenol A diglycidylether and (meth)acrylic acid. Such compounds are well known in the art and have been described for instance in WO 2009/147092.

The hydrophilic compounds (Aiii) in general are polyols comprising a functional group that can exhibit an ionic or a non-ionic hydrophilic nature. Preferred are polyols containing one or more anionic salt groups, such as carboxylate, sulfonate and phosphonate salt groups or acid groups which may be converted to an anionic salt group, such as carboxylic acid, sulfonic acid or phosphonic acid groups. Preferred are hydroxycarboxylic acids represented by the general formula $(HO)_xR(COOH)_y$, wherein R represents a straight or branched hydrocarbon residue having 1 to 12 carbon atoms, and x and y independently are integers from 1 to 3. Examples of these hydroxycarboxylic acids include citric acid, malic acid, lactic acid and tartaric acid. The most preferred hydroxycarboxylic acids are the α,α-dimethylolalkanoic acids, wherein x=2 and y=1 in the above general formula, such as for example, 2,2-dimethylolpropionic acid and 2,2-dimethylolbutanoic acid. The polyol can also be a polyester polyol and/or a polycarbonate polyol and/or a polyether polyol and/or a polyacrylic polyol containing the carboxylic acid, the sulfonic acid or the phosphonic acid as one of its building blocks. It is also possible that the compound (Aiii) contains a non-ionic chain like polyethyleneoxide, polypropyleneoxide or random and bloc copolymers therefrom. An example of this is polyethoxylated trimethylolpropane (YMER®N120). Compounds (Aiii) advantageously are different from compounds (Aii).

Polyols (Aiv) and (Biv) optionally used in the preparation of the polyurethanes may be high molecular weight polyols having a number average molecular weight of at least 400, or low molecular weights polyols having a molecular weight lower than 400 Daltons or any combinations or mixtures thereof. They can be saturated or unsaturated. Typically though they are saturated polyols. More particularly, when polyols (Aiv) and/or (Biv) are used, (Aiv) are preferably saturated polyols whereas (Biv) can be saturated polyols and/or unsaturated polyols. Often though compounds (Biv) are saturated polyols as well. In a preferred embodiment they are the same as the polyols (Aiv).

High molecular weight polyols preferably have a number average molecular weight which does not exceed 5,000, more preferably does not exceed 1,000 Daltons.

Examples of low molecular weight polyols are ethyleneglycol, diethyleneglycol, propyleneglycol, dipropyleneglycol, neopentyl glycol, 1,3-propane diol, 1,3-butanediol, 1,4-butanediol, 1,5-pentanediol, 1,6-hexanediol, 2-ethyl-1,6-hexanediol, trimethylolpropane, di-trimethylol propane, glycerol, pentaerythritol, di-pentaerythritol, cyclohexane dimethanol, 1,4-bishydroxymethylcyclohexane, 1,3-bis(4-hydroxycyclohexyl)propane, 2,2,4,4-tetramethylcyclobutane-1,3-diol, 1,3- and 1,4-cyclohexanediol, cyclooctanediol, norbornanediol, pinanediol, decalindiol, perhydrogenated bisphenol A and other compounds comprising two cyclohexanol units connected by an alkylene bridge.

Examples of high molecular weight polyols are polyester polyols, polyether polyols, polycarbonate polyols, polyacrylate polyols, polysiloxane polyols, as well as combinations thereof (of any of these).

Particularly preferred are polyester polyols, especially those made from the polycondensation of neopentylglycol and adipic acid and/or isophthalic acid.

Polyols having at least 3 hydroxyl groups can be used to increase branching.

Compounds (Aiv) advantageously are different from any of (Aii) to (Aiii). Compounds (Biv) advantageously are different from compounds (Bii).

In an embodiment of the invention, compounds (iv) are being used to prepare the polyurethanes (A) and/or (B). In another embodiment of the invention, no compounds (iv) are used to prepare the polyurethanes (A) and/or (B).

Compounds (Av) and (Bv) optionally used in the preparation of the polyurethanes comprise at least one, often at least 2 reactive groups capable to react with isocyanate groups. Compounds (Av) advantageously are different from any of (Aii) to (Aiv). Compounds (Bv) advantageously are different from compounds (Bii) and (Biv). Compounds (Av) and (Bv) can be used to increase the molecular weight of the polyurethanes.

Compounds (v) typically are not polyols. Compounds (v) preferably comprise one or more active amino groups. Examples of suitable compounds (v) include for instance mono- and di-amines, and/or mono- or di-functional amino alcohols. Other preferred compounds (v) are those comprising one or more mercapto groups such as mercaptans and/or mercapto alcohols.

Most typically compounds (v) are polyamines, often diamines. Preferred are water-soluble aliphatic, alicyclic, aromatic or heterocyclic primary or secondary polyamines having up to 60, preferably up to 12 carbon atoms, or hydrazine. The polyamine used has preferably an average functionality of 2 to 4, more preferably 2 to 3. Preferred polyamines are those which are more reactive towards the isocyanate groups than water, because the extension of the polyester urethane (meth)acrylate optionally takes place in the aqueous medium. Examples of such compounds (v) include hydrazine, adipic acid dihydrazide, 1,2-ethylenediamine, 1,2-propanediamine, 1,4-butanediamine, 1,6-hexanediamine, 2-methyl-1,5-pentanediamine,1,8-octanediamine, piperazine, isophorone diamine, meta xylilenediamine, polyethylene imines (e.g. Epomin® from Nippon Shokubai), polyoxyethylene amines and polyoxypropylene amines (e.g. Jeffamines® from Texaco), sulfoalkylated amines (e.g. Polyeps® 520 from Raschig) as well as mixtures thereof. Ethylene diamine and meta xylenediamine are often preferred.

Typically, mercaptans have preferably an average mercapto functionality of 2 to 4, more preferably 2 to 3. Examples include 1,8-dimercapto-3,6-dioxaoctane (DDMO from Arkema), ethyleneglycol dimercaptoacetate (GDMA from Swan), trinnethylolpropane trimercaptoacetate (TTMA from Swan), trimethylolpropane tri (3-mercaptopropionate) (TT-3-MP from Swan).

Compounds (v) with an additional functionality, in particular a reactive additional functionality, are also considered in the frame of the invention. Particularly suitable are amino(polyalkoxysilane) compounds. Other suitable compounds are mercapto(polyalkoxysilanes). By a poly(alkoxysilane) compound is meant to designate in the present invention a compound containing at least two alkoxysilane groups. Products falling into this category are N-ethyl-amino-isobutyl-trimethoxysilane (Silquest®A-link15), gamma-aminopropyltriethoxysilane (Silquest®A-1100), gamma-aminopropyltrimethoxysilane (Silquest®A-1110), N(beta-aminoethyl) gamma-aminopropyltrimethoxy-silane (Silquest®A-1120), N(beta-aminoethyl) gamma-aminopropylmethyldimethoxy-silane (Silquest®A-2120), bis-(gamma-trimethoxysilylpropyl)amine (Silquest®A-1170) and/or N,N' bis(beta-aminoethyl)-gamma-aminopropyltrimethoxy-silane (Silquest®A-1130). Examples of mercapto (polyalkoxysilanes) are gamma-mercaptopropyltrimethoxysilane (Silquest®A-189), gamma-mercaptopropyltriethoxysilane (SiSib®PC2310), gamma-mercaptopropylmethyldimethoxy-silane (SiSib®PC2230).

Compounds (v) with an additional functionality, in particular a non-reactive additional functionality, are also considered in the frame of this invention. As a valuable but non limitative example, these compounds can advantageously be fluoro-amines. A suitable example of fluoro-amine is 2,2,2-trifluoroethylamine.

In an embodiment of the invention, compounds (v) are being used to prepare the polyurethanes (A) and/or (B). In another embodiment of the invention, no compounds (v) are used to prepare the polyurethanes (A) and/or (B).

Compounds (Avi) and (Bvi) optionally used in the preparation of the polyurethanes are reactive electrophilic compounds that typically are selected from compounds that contain at least one isocyanate group, at least one epoxy group, at least one aziridine group, at least one carbodiimide group and/or at least one oxetane group. Preferred are compounds that contain at least one isocyanate or epoxy group. If both nucleophilic and electrophilic compounds are used to prepare the polyurethanes of the invention then they preferably are added in subsequent steps to avoid that they react with each other rather than with the polymer.

In one embodiment of the invention, compounds (vi) are polyisocyanates such as described above (see compounds (i)). The isocyanate (vi) can be same as the isocyanate (i) or can be different therefrom. When the same, then this isocyanate (i) is added in a further amount, typically in a later step (e.g. step 3) to increase allophanate formation. Preferred isocyanates (vi) are hexamethylene diisocyanate, isophorone diisocyanate and/or methylene bis[4-isocyanatocyclohexane]. The isocyanate can alternatively be the partial reaction product of a diisocyanate or polyisocyanate with another molecule having at least one functionality capable to react with the isocyanate. Typically but not limitatively, this molecule can be found within the products (ii) of the present invention. Additional isocyanate group containing compounds can for instance be used to increase the amount of allophanates and the resulting branching to increase the molecular weight and modify polymer architecture.

In the same or another embodiment of the invention compounds (vi) are reactive and selected from compounds containing at least one poly(alkoxysilane) group such as gamma-glycidoxypropyltrimethoxysilane, gamma-glycidoxypropyltriethoxysilane, gamma-isocyanatopropyltrimethoxysilane and/or gamma-isocyanatopropyltriethoxysilane. In these compounds (vi), the poly(alkoxysilane) group is present in addition to the at least one isocyanate group, at least one epoxy group, at least one aziridine group, at least one carbodiimide group and/or at least one oxetane group. Such compounds can be used for instance to introduce other functionalities.

Yet other examples of suitable compounds (vi) are those containing fluorine groups.

In an embodiment of the invention, compounds (vi) are being used to prepare the polyurethanes (A) and/or (B). In another embodiment of the invention, no compounds (vi) are used to prepare the polyurethanes (A) and/or (B).

In a particular embodiment of the present invention, the polyurethane (A) contains poly(alkoxysilane) groups. In said embodiment, the optional polyols (Aiv) and/or (Biv), where used, can be selected from saturated polyols and/or from unsaturated polyols. In particular, the polyols (Aiv) where present can then be selected from saturated polyols and/or from unsaturated polyols, though generally they are saturated polyols.

In another particular embodiment of the present invention, a compound (v) is used that is selected from amino (polyalkoxysilane) compounds and/or a compound (vi) is used that is selected from compounds containing at least one poly(alkoxysilane) group and further at least one isocyanate group, at least one epoxy group, at least one aziridine group, at least one carbodiimide group and/or at least one oxetane group. In this particular embodiment, the optional polyols (Aiv) and/or (Biv), where present, can be saturated polyols and/or unsaturated polyols.

In these particular embodiments wherein the polyurethane (A) contains poly(alkoxysilane) groups, the radiation curable composition (I) has typically a steady-state creep viscosity $\eta_{30}$ at 23° C. of at least $1 \cdot 10^3$ Pa·s.

Optionally, the polyurethanes (A) and/or the polyurethanes (B) of the invention can contain at least one function selected from allophanate, urea and/or biuret functions. The conversion of urethanes into allophanates and ureas into biurets creates polymer branching, resulting in an increase in molecular weight, and the resulting chain entanglement leading to a decrease of polymer flow. Branching also increases the reactive functionality of the polymer and it facilitates an efficient thermal cure if applied.

In general radiation curable compositions (I) of the invention comprise, relative to the total weight of (A), (B) and (C), at least 10 wt % of compounds (A). In general this amount is at least 40 wt %, preferably at least 50 wt %, most preferably at least 60 wt %. In general this amount is at most 97.5 wt %, typically at most 90 wt %, preferably at most 80 wt %, most preferably at most 70 wt %.

In general radiation curable compositions (I) of the invention comprise, relative to the total weight of (A), (B) and (C), at least 2.5 wt % of compounds (B). In general this amount is at least 5 wt %, preferably at least 7.5 wt %, most preferably at least 10 wt %. More particularly, this amount is at least 12 wt %, preferably at least 15 wt %, more preferably at least 18 wt %. In general this amount is at most 50 wt %, typically at most 40 wt %, preferably at most 30 wt %, most preferably at most 20 wt %.

In general radiation curable compositions (I) of the invention comprise, relative to the total weight of (A), (B) and (C), from 0 to 40 wt % of compounds (C). In general this amount is at least 5 wt %, preferably at least 10 wt %, most preferably at least 15 wt %. In general this amount is at most 40 wt %, typically at most 35 wt %, preferably at most 30 wt %, most preferably at most 25 wt %.

A further component of the radiation curable compositions (I) of the invention advantageously is water.

The amount of water typically is in the range of from 50 to 75 wt %, relative to the total weight of the composition. More typically this amount is from 50 to 65 wt %, more in particular from 50 to 60 wt %.

Typically the radiation curable compositions (I) of the invention are characterized by a double bond equivalent (number of milli-equivalents of ethylenic double bonds per g of solid) of from 1 to 8 meq/g, preferably of from 2 to 7 meq/g. More typically the double bond equivalent is from 3 to 6 meq/g, and preferably from 4 to 5 meq/g.

Typically the weight of urethane groups —NH—CO—O— in the radiation curable composition (I) of the invention is from 2.5 to 35 wt %, more preferably from 5 to 30 wt %, even more preferably from 10-25 wt %, and most preferably from 15-20 wt %, relative to the total weight of the polymer composition.

Typically the weight of allophanate groups —NH—CO—N—CO—O— in the radiation curable composition (I) of the invention is from 0 to 10 wt %, more preferably from 0.25 to 7.5 wt %, even more preferably from 0.5-5 wt %, and most preferably from 1-2.5 wt %, relative to the total weight of the polymer composition.

The composition and process according to the present invention are advantageous in that they are able to provide dispersions with low volatile organic content (VOC), a high solids content, a low viscosity, a low particle size, an excellent colloidal stability and a low film formation temperature.

Typically compositions of the invention are characterized by one or more of the following:
  a solid content between 30 and 50 wt %, preferably between 40 and 50 wt %,
  a Brookfield viscosity between 20 and 1,000 mPa·s,
  a pH between 5 and 9,
  a mean particle size between 20 and 200 nm,
  a minimum film formation temperature below 10° C.
  a colloidal stability exceeding 10 days at 60° C.

The compositions according to the invention in general are characterized by a low tack before cure.

The compositions according to the invention permit to obtain coatings which, after radiation curing, show an excellent chemical resistance against water, solvents and stains, a superior mechanical resistance against scratch and abrasion—while giving an excellent gloss and distinctness of image (DOI). The good balance of properties is linked to the antagonistic effect of reducing the polymer flow to control the robustness of the application against its detrimental effect on gloss and distinctness of image (DOI).

These coatings also exhibit a good adhesion on porous and non-porous substrates. The compositions according to the invention are particularly suitable for making coatings for wood furniture and plastic coatings with an excellent mirror effect. The present invention more particularly relates to a process and the use of the compositions for making high gloss coatings, especially on wood and plastic substrates.

Radiation curable compositions (I) of the invention can be used in many end applications. They are for instance highly suitable for use in coatings for wood, plastic, glass, textile, leather, metal and concrete. The compositions according to the invention are suitable for making inks (incl. inkjet) and overprint varnishes, adhesives as well as coatings. The compositions according to the invention are also suitable for coating 3-dimensional objects made from the above substrates, optionally pre-coated with other coatings with the same or another chemical nature.

In another embodiment of the invention, the polymer composition (I) is not dispersed in water but is being used alone, in solution in an organic solvent and/or in combination with (polyacrylate) reactive diluents. They can similarly be used in combination with polymethacrylate reactive diluents, however polyacrylate reactive diluents are preferred.

The present invention therefore relates to the use of the compositions of the invention for making inks (incl. inkjet), varnishes, adhesives or coatings and to a process for making inks (incl. inkjet), varnishes, adhesives or coatings wherein a composition as described here above is used. The present invention also relates to process for preparing a coated article comprising a step wherein the article is coated with a radiation curable composition (I) according to the invention.

The radiation-curable compositions (I) according to the present invention may also be subject to additional cross-linking reactions due to the presence of reactive functions present in the polyurethane (A), the polyurethane (B) and/or the ethylenically insaturated compound (C) as well as in external compounds, including oligomers and polymers. Suitable reactive functions include, amines, (blocked) isocyanate, aziridine, carbodiimide, alkoxysilane, acetoacetoxy, carbonyl, epoxy and oxetane groups. Suitable external crosslinkers are (blocked) polyisocyanates, polyaziridines, polycarbodiimides, metal salts like zirconium ammonium carbonate, polyepoxydes and polyalkoxysilanes. In this case, the polymer compositions (I) are capable to do thermal curing and is referred to as "dual cure"

in reference with the polymer curing ability by separated thermal-induced and radiation-induced mechanisms. The dual cure is often beneficial since a preliminary thermal self-curing of the polymer can happen at room to moderate temperature in order to control the polymer flow while still providing the required body, high gloss and distinctness of image.

It is often even more beneficial to have a polymer composition (I) containing two distinct polymers, one containing the crosslinking functionality and the other one not. In this situation, it is possible to limit and control the overall polymer flow with the thermal crosslinking of only one part of the polymer that creates a semi-interpenetrated network, entrapping the polymer with free motion. It is also the case that the crosslinked network is built over a timeframe suitable with the application, meaning that the highest flow is obtained immediately after the film formation (gloss and distinctness of image creation) and that it is gradually decreased over time (flow control). The thermal curing of the polymer material in this embodiment may be ensured by grafted poly(alkoxysilane) functionality, known to be stable & compatible with neutral to alkaline water-based dispersions and effective at ambient or moderate crosslinking temperature. It is usually possible to achieve such a polymer composition by using the appropriate succession of process steps. In this embodiment, the final dispersions of the invention are advantageously one-component dual cure compositions with a very good colloidal stability and a long shelf-life.

The dual cure compositions of this embodiment are characterized by an insoluble fraction (gel content) which is obtained after film formation as the result of the thermal curing. It can be characterized by a gel test.

Typically the radiation curable composition (I) according to this embodiment is characterized by an insoluble fraction (gel content) that is above 5 wt %, as measured gravimetrically after drying of the aqueous radiation curable composition (I) for 4 hours at 23° C. and 2 hours at 80° C., followed by 24 hours immersion in tetrahydrofuran at 23° C. and drying of the gelled composition (I) for 1 hour at 110° C.

In the invention, the gel content was measured using the following method:

A series of 3 cleaned and acetone-degreased pieces of a metallic tray of 200 microns mesh (15×45 mm) fitted with a metallic suspending hook are weighted using an analytical balance Mettler™ AE163 and dipped in the polyurethane dispersion. The wet trays are then dried in a convective oven for 4 h at 23° C. and 2 h at 80° C., followed by cooling to room temperature. The coated trays are weighted to determine the initial weight W1 (in grams) of dry polyurethane composition by comparing the initial weight of the trays with the weight of the dry coated trays. The dry coated pieces are then soaked in a glass tube filled with tetrahydrofuran at 23° C. for 24 hours. The trays are then carefully removed from the water and drained for 15 minutes, taking care that the swollen polyurethane composition residues eventually present does not touch the walls of the glass tube. The trays supporting the eventual polyurethane composition residues are then dried in an oven for 1 hour at 110° C. They are weighed again to provide the insoluble materials weight W2 (in grams) by comparing the initial weight of the trays with the weight of the dry polyurethane composition residue on the trays. The insoluble polymer content (gel) is expressed as the percentage of the insoluble materials weight W2 compared with the original weight W1. An average value for the 3 measurements is reported.

Yet another aspect of the invention relates to an article or substrate coated, printed or treated, either partially or entirely, with a radiation curable composition according to the invention.

The radiation-curable compositions (I) according to the present invention are preferably cured by irradiation with (ultra)violet light between 200 nm and 440 nm (including light emitted by LED sources), generally in the presence of photoinitiator. They can also be cured by electron-beam irradiation, allowing the use of compositions free of photoinitiator. The compositions according to the invention are providing extremely rapid curing.

The products of the invention can be applied by any suitable process including dipping, brush, curtain, spray, roller, heliogravure, (rotary) screen, flexography, lithography and digital printing techniques including inkjet. Spray application is often preferred.

The products of the invention can be used as basecoat and/or topcoat on a variety of substrates.

The examples which follow illustrate the invention without limiting it.

Example 1: Preparation of a Composition (I) According to the Invention

A 5-liters double-wall glass reactor (equipped with an air inlet, a mechanical stirrer, a thermocouple, a vapor condenser and a dropping funnel) is charged with 123.63 g of hexamethylene diisocyanate (Desmodur®H), 0.33 g of tert-butylated hydroxytoluene (BHT) and 0.22 g of Bismuth neodecanoate (Bicat®8108M) under gentle agitation (80 rpm). It is then heated to a temperature of 30° C. under air sparging. The reaction is started by adding 283.30 g of glycerol-tripropoxylate-diacrylate (1OH=155 mgKOH/g) from the dropping funnel into the reactor over a period of approximately 2 hours in order to maintain the reaction temperature below 55° C. The reaction stoichiometry between the isocyanate functions and the hydroxyl functions is 53%. After the complete addition of the reactant, the reaction mixture is further cooked during less than 1 hour at 55° C. until the residual isocyanate content reaches the theoretical value of 1.69 meq/g. 36.48 g of dimethylolpropionic acid is then added as a powder into the reaction mixture. The reaction temperature is increased to a first plateau at 80° C. and then the temperature is gradually increased to a second plateau at 100° C., which is maintained until the residual isocyanate content reaches the theoretical value of 0.33 meq/g. The reaction is then further taking place until the residual isocyanate content falls down to 0.05 meq/g or below. The neutralization of the carboxylic acid groups is achieved at 95° C. by the addition of 19.67 g of a sodium hydroxide aqueous solution (31 wt %) into the hot polymer, immediately followed by cooling the reactor down to 75° C. 536.51 g of demineralized water at ambient temperature is added to the reactor over a period of 30 minutes under higher shear agitation (180 rpm). The polymer dispersion obtained after phase inversion is then cooled down to room temperature and drummed off by passing through a 1 μm filter bag. The product displays a solid content (2 h 120° C.) of 44.8%; a viscosity (Bkf, 50 rpm) of 363 mPa·s; a pH of 6.6; a mean particle size (DLS) of 47 nm; a minimum film formation temperature <0° C.; a colloidal stability (60° C.) >10 days.

The average particle size of the aqueous polymer dispersion was measured with Dynamic Light Scattering using a Coulter® Delsa Nano equipment.

The colloidal stability was assessed with Multiple Light Scattering using a Turbiscan® equipment (Formulation) by observing the decantation and/or phase separation on a 20 g sample placed in an oven at 60° C. After the standard test is performed, the dispersion/emulsion is inspected visually for any sedimentation or other change, for example in average particle size or pH.

FORMULATION EXAMPLES

The compositions of the invention were then formulated with 2% of a photo-initiator (Esacure HB) and the viscosity was adjusted to 500 mPa·s (Brookfield) using the thickener Additol VXW6360:water (1:1) up to a maximum of 2%. The formulations were applied on miscellaneous substrates depending on the test method.

Test results are summarized in Table 1 below.

TABLE 1

| Coating performance | |
|---|---|
| | EX 1 |
| Creep $\eta_{30}$ (Pa.s) | $1.9 \, 10^5$ |
| Tack before cure (Leneta ®) (0-5) | 2-3 |
| Water release (PVC) (1-5) | 2-3 |
| Resolubility (1-5) (glass) (24 h) | 2-3 |
| Gloss 60° (GU) (ABS) | 87.1 |
| Gloss 20° (GU) (ABS) | 84.3 |
| DOI (%) (ABS) | 98.7 |
| Log Haze (ABS) | 2.4 |
| Mirror & body (PVC) (1-5) | 5 |
| Yellowing (Leneta ®) ($\Delta$b-value) | 1.4 |
| Stain, coffee (Leneta ®)(1-5) | 2 |
| Stain, ammonia (Leneta ®) (1-5) | 5 |
| Persoz hardness (glass) (sec) | 337 |

Throughout the invention and in the Examples Section the following test methods were used:

Tack:

The tack can be assessed qualitatively by gently pressing a finger on to coating substrate and determining the resulting perception of immediate adhesion. The finger tack test can be reported in a scale from 1 to 5; 1=wet—2=very tacky—3=tacky—4=slightly tacky—5=non tacky. The coatings of the invention advantageously situate within a tack value from 2 to 5, preferably from 3 to 4, most preferably 4.

Stain & Chemical Resistance:

The method covers the stain & chemical resistance of a coating of 50µ wet applied to a non-porous substrate (white opacity chart, Lenete®). The coating was dried for 5 minute at 50° C. and then cured under UV-lamp (Hg) of 80 W/cm at 5 m/min. The resistance is assessed about 24 hours after curing of the coating, by putting on the coating a glass microfiber filter saturated by the test substance and covered with a plastic cap during 16 hours. The test substances used are mustard, coffee (4% Nescafe in water), eosine, isobetadine, ethanol (50% solution in water) and ammonia (10% solution in water). The stains are then washed with a couple of rubs using a tissue saturated with water. The black marker stain is made with the black marker (alcohol type, Artline N-70) and is washed after 5 minutes at room temperature using a tissue saturated with isopropanol. The remaining stains are visually assessed using a 1-5 scale: 5=no stain; 4=very light stain; 3=moderate stain; 2=strong stain; 1=very strong stain. A high value (5) is expected to provide the best protection against any household product spillage.

Mirror Effect and Body:

The method visually judges the quality of the reflected image on a coating made on the following conditions: 120µ wet layer is applied with a racle on grey micro-structured 3 mm PVC substrate. Water was evaporated from the coating during 20 minutes at 40° C. Subsequently coatings were exposed to UV radiations from a 80 Watt Hg lamp at a defined conveyer speed: 1×5 m/minute. The rating is based on a 1-5 scale, 5=highest quality reflection, meaning coating is able to hide the structure of the substrate. A high value is needed for applications where the reflected image is an important feature.

Water Release:

The water release was assessed by observing the visual aspect after 48 hours of non-pigmented coating made in the following conditions: 200µ wet layers were applied with a doctor blade on grey PVC 3 mm sheets. Water was evaporated from the coating during 6 minutes at 40° C. Subsequently coatings were exposed to UV radiations from a 80 Watt Hg lamp at a defined conveyer speed: 1×5 m/minute. Rating was on a scale from 5 to 0, wherein 5 stands for transparent coatings (very good water release properties) and 0 stands for white opaque coatings (very bad water release properties). According to the rating used 1 stands for very hazy/grey with white zones, 2 stands for very hazy/grey, 3 stands for hazy/grey, 4 stands for light hazy/light grey and 5 stands for transparent.

Yellowing ($\Delta$b) is measured with a Braive Instruments® Supercolor colorimeter, color differences are calculated as described in the ASTM method D2244-11. A coating of 50µ wet is applied to a non-porous substrate (white Leneta® paper). The coating was dried for 5 minute at 50° C. and then cured under UV-lamp (Hg) of 80 W/cm at 5 m/min. Yellowness is measured 1 hour after the crosslinking on the coating ($L_b$) and on the non-coated part of the Leneta ($L_s$) $\Delta$b is the difference between $L_b$ and $L_s$.

Optical Properties:

The gloss (60° and 20° angles), the Distinctness of Image (DOI), and the haze were measured using a RhoPoint®IQ integrated equipment. These values were measured on coatings prepared in the following conditions: a coating is made with a bar coater on black ABS with a thickness of 120µ (wet), dried 20 min at 40° C., cured at 5 m/min with a 80 W Hg UV lamp. Gloss is measured according to ISO 2813 standard and haze is measured according to ISO DIS13803 standard.

Adhesion:

The method covers the adhesion of a coating applied and cured on a given substrate at a given thickness. 5 cuts of ~1 cm and spaced by ~1 mm are made in the coating using a knife, followed by 5 similar cuts in the transversal direction. The adhesion was measured using an adhesive tape firmly pressed on the cross-cut coating and removed rapidly; the damage to the cross-cut surface area of the coating due to adhesion loss is expressed in a 1-5 scale, 5=best. A high adhesion (5) is necessary to ensure a strong permanent bond between the coating and the substrate.

Hardness:

The method covers the surface hardness of a coating of 120µ wet applied on glass, dried 20 minutes at 40° C. and cured at 5 m/min with a 80 W Hg UV lamp. The coated samples are stabilized during 24 hours in a conditioned room (20° C., 50% humidity) and a pendulum hardness (Persoz) is determined in seconds on 3 places of the surface. The mean value is calculated and reported.

Resolubility is assessed on a coating of 90µ wet applied on a glass plate and dried for 20 minutes at 40° C. A droplet of water is poured on the coating 5 minutes, 1 hour and 24 hours after the coating has been dried. Resolubility is assessed by rubbing the surface with the finger and rated on a 1-5 scale. 5=dried coating easily solubilized by water, 4=dried coating solubilized by water, 3=dried coating solubilized by water, creating insoluble peels, 2=dried coating hardly solubilized by water, 1=dried coating not solubilized by water.

Steel Wool Scratch Resistance:

The method covers the scratch resistance of a coating of 120µ wet applied on black Leneta®, dried 20 minutes at 40° C. and cured at 5 m/min under a 80 W/cm Hg UV lamp. The coated samples are stabilized during 24 hours in a conditioned room (20° C., 50% humidity). The scratch is assessed at room temperature using a linear Taber abrader using steel wool ref. 00 with a 500 g load and applying 10 double rubs (20 r/min). The scratch damage to the coating is assessed visually using a 0-5 scale (5=no visible scratch).

Example 3

A double-wall glass reactor equipped with a mechanical stirrer, a thermocouple, a vapor condenser and a dropping funnel is charged with 26.5 g of hexamethylene diisocyanate and 0.04 g of bismuth neodecanoate. The dropping funnel is charged with 57.8 g of glycerol-tripropoxylate-diacrylate; this quantity of reactant is calculated based on its measured hydroxyl value (mgKOH/g) so that the equivalent ratio of OH to NCO groups is 52%. The reactor is stirred under air sparging and the reactor temperature set-point is fixed at 50° C. The addition occurs in about 2.5 h and the rate is controlled so that the reactor temperature does not exceed 52° C. due to the exothermic reaction. The reaction is then matured at 50° C. until the measured isocyanate value (meq/g) reaches the target level calculated from the above stoichiometry. Then 7.82 g of dimethylolpropionic acid with 0.07 g of butylated hydroxytoluene are charged into the reactor and heated to 100° C. The reaction is continued at that temperature until the isocyanate value falls below 0.10 meq/g or reaches a plateau, defined by a maximum decrease of 0.02 meq/g in 30 minutes. The reaction mixture is cooled down to 95° C. and 4.00 g of a 31% aqueous solution of sodium hydroxide is added to the reactor and stirred until complete homogenization. The reactor temperature is cooled down to 75° C. and the agitation speed is increased to 180 rpm while 107.20 g of demineralized water is being added to the reactor in around 30 minutes, to proceed to the phase inversion and the formation of a stable polymer colloid. The reactor is cooled down to 30° C. after complete homogenization and then drummed off with a filtration step on a 1 micron sieve. The final dispersion has a solid content of 43.1%, a viscosity of 282 mPa·s, a pH of 6.7, a mean particle size of 61 nm and a minimum film formation temperature <0° C. The colloidal stability of the product exceeds 48 days at 60° C.

The comparative examples 1A, 1B, 2A as well as examples 3 to 13 are prepared according to the same process and the reagents types and amounts used are summarized in Table 2. The comparative example 2B is prepared according to the recipe of example 1 from patent US 2009270581. The dispersions characteristics are presented in Table 3.

Comparative Example 1A

Comparative Example 1A is prepared according to the recipe of example 3. The mixture of acrylated reactants (compounds (ii)) is constituted by trimethylolpropane-tripropoxylate-diacrylate, Cardura®E10P monoacrylate and hydroxypropyl acrylate in an equivalent stoichiometry OH/NCO of 50%. Trimethylolpropane triacrylate is added to the polymer before neutralization with the sodium hydroxide solution. Dibutyltin dilaurate with some triethylamine is used instead of bismuth neodecanoate as catalysts.

Comparative Example 1B

Comparative Example 1B is prepared according to the recipe of example 3. The mixture of acrylated reactants (compounds (ii)) is constituted by glycerol-tripropoxylate-diacrylate, Cardura®E10P monoacrylate and hydroxypropyl acrylate in an equivalent stoichiometry OH/NCO of 50%. Bismuth octoate is used instead of bismuth neodecanoate. Some Acticide®MBS is added to the dispersion as a biocide.

Comparative Example 2A

Comparative Example 2A is prepared according to the recipe of example 3. The glycerol-tripropoxylate-diacrylate is used in such an amount that an equivalent stoichiometry OH/NCO of 50% is obtained.

Comparative Example 2B

Comparative Example 2B is prepared according to the recipe of example 1 of US 2009270581.

Example 4

Example 4 is prepared according to the recipe of example 3. The glycerol-tripropoxylate-diacrylate is used in such an amount that an equivalent stoichiometry OH/NCO of 55% is obtained.

Example 5

Example 5 is prepared according to the recipe of example 3. A mixture of hexamethylene diisocyanate and isophorone diisocyanate is now used and the glycerol-tripropoxylate-diacrylate is used in such an amount that an equivalent stoichiometry OH/NCO of 55% is obtained.

Example 6

Example 6 is prepared according to the recipe of example 3. The trimethylolpropane-tripropoxylate-diacrylate is used in such an amount that an equivalent stoichiometry OH/NCO of 52% is obtained.

Example 7

Example 7 is prepared according to the recipe of example 3. The glycerol-tripropoxylate-diacrylate is used in such an amount that an equivalent stoichiometry OH/NCO of 55% is obtained, but the neutralization is ensured by triethylamine instead of a sodium hydroxide solution.

Example 8

Example 8 is prepared according to the recipe of example 3. The glycerol-tripropoxylate-diacrylate is used in combination with some trimethylolpropane in such amounts that an equivalent stoichiometry OH/NCO of 55% is obtained.

Example 9

Example 9 is prepared according to the recipe of example 3. The glycerol-tripropoxylate-diacrylate is used in such an amount that an equivalent stoichiometry OH/NCO of 52% is obtained. Some propylene diamine is used to extend the polymer after reaction with free isocyanate and the formation of urea.

Example 10

Example 10 is prepared according to the recipe of example 3. The glycerol-tripropoxylate-diacrylate is used in such an amount that an equivalent stoichiometry OH/NCO of 55% is obtained. The Silquest®A1100 amino-triethoxysiloxane is introduced as a reactant after the completion of the reaction with dimethylolpropionic acid before the remaining isocyanates are consumed to allophanates.

Example 11

Example 11 is prepared according to the recipe of example 3. The glycerol-tripropoxylate-diacrylate is used in such an amount that an equivalent stoichiometry OH/NCO of 55% is obtained. The additional hexamethylene diisocyanate is introduced as a reactant after the completion of the reaction with dimethylolpropionic acid and further consumed to allophanates.

Example 12

Example 12 is prepared according to the recipe of example 3. The glycerol-tripropoxylate-diacrylate is used in such an amount that an equivalent stoichiometry OH/NCO of 52% is obtained. The Silquest®A-Link35 isocyanato-trimethoxysilane is introduced as a reactant after the completion of the reaction with dimethylolpropionic acid and further consumed to allophanates.

Example 13

Example 13 is prepared according to the recipe of example 3. The final polymer dispersion is formulated with Coatosil®MP200 oligomeric poly(epoxy)(methoxy)siloxane.

The formulation of examples 1A, 1B, 2A, 2B and 3-13 is made according to the formulation of example 1.

The performance measurements are disclosed in Tables 4 and 5.

Examples 1 and 3-13 show a good balance of properties between the creep values and the optical properties (DOI; mirror & body).

For the comparative example 1A, the creep value is very low (despite good optical and resistance properties).

Comparative Example 1B shows poor optical properties, water release, hardness and steel wool scratch resistance when compared to the compositions according to the present invention.

For the comparative example 2A, the optical properties are falling short (despite fair creep value and resistance properties).

For the comparative example 2B, the optical properties and the water release are bad (despite the good creep value and resistance properties).

TABLE 2

| Products composition | | | | | | | | |
|---|---|---|---|---|---|---|---|---|
| | EX1A | EX1B | EX2A | EX2B | EX3 | EX4 | EX5 | EX6 |
| Hexamethylene diisocyanate | 1000.1 | 1083.8 | 641.7 | Example 1 of US 2009270581 | 26.5 | 26.5 | 193.8 | 258.1 |
| Hexamethylene diisocyanate | | | | | | | | |
| Isophorone diisocyanate | — | — | — | | — | — | 64.0 | — |
| Glycerol(OP)3diacrylate | — | — | 1386.8 | | 57.8 | 61.0 | 523.4 | — |
| TMP(OP)3 diacrylate | 1778.1 | 1920.8 | — | | — | — | — | 668.4 |
| Cardura ® E10P, monoacrylate | 504.9 | 548.6 | — | | — | — | — | — |
| Hydroxypropyl acrylate | 21.2 | 22.8 | — | | — | — | — | — |
| Trimetylolpropane triacrylate | 1001.6 | — | — | | — | — | — | — |
| Trimethylolpropane | — | — | — | | — | — | — | — |
| Dimethylolpropionic acid | 311.2 | 347.3 | 189.4 | | 7.8 | 7.8 | 68.9 | 76.2 |
| DBTL | 1.27 | — | — | | — | — | — | — |
| Bismuth octoate | — | 1.96 | — | | — | — | — | — |
| Bismuth neodecanoate | — | — | 0.99 | | 0.04 | 0.04 | 0.34 | 0.45 |
| Butylated hydroxytoluene | 1.81 | 3.73 | 0.66 | | 0.07 | 0.07 | 0.64 | 0.75 |
| Propylene diamine | — | — | — | | — | — | — | — |
| Silquest ® A1110 | — | — | — | | — | — | — | — |
| Silquest ® ALink 35 | — | — | — | | — | — | — | — |
| Sodium hydroxide (31%) | 148.6 | 187.4 | 102.1 | | 4.00 | 4.00 | 37.1 | 40.3 |
| Triethylamine | 10.8 | — | — | | — | — | — | — |
| Water | 5705 | 5873.8 | 2680.9 | | 107.2 | 107.2 | 1045 | 1224 |
| Coatosil ® MP200 | — | — | — | | — | — | — | — |
| Acticide ® MBS | — | 9.89 | — | | — | — | — | — |

| | EX7 | EX8 | EX9 | EX10 | EX11 | EX12 | EX13 |
|---|---|---|---|---|---|---|---|
| Hexamethylene diisocyanate | 297.2 | 290.5 | 348.5 | 217.7 | 261.3 | 61.8 | 26.5 |

TABLE 2-continued

| Products composition | | | | | | | | |
|---|---|---|---|---|---|---|---|---|
| Hexamethylene diisocyanate | — | — | — | — | 12.5 | — | — |
| Isophorone diisocyanate | — | — | — | — | — | — | — |
| Glycerol (OP)3diacrylate | 642.1 | 627.7 | 755.1 | 470.4 | 564.5 | 138.5 | 57.8 |
| TMP(OP)3 diacrylate | — | — | — | — | — | — | — |
| Cardura ® E10P, monoacrylate | — | — | — | — | — | — | — |
| Hydroxypropyl acrylate | — | — | — | — | — | — | — |
| Trimetylolpropane triacrylate | — | — | — | — | — | — | — |
| Trimethylolpropane | — | 10.5 | — | — | — | — | — |
| Dimethylolpropionic acid | 87.7 | 85.7 | 99.1 | 61.9 | 74.3 | 18.3 | 7.8 |
| DBTL | — | — | — | — | — | — | — |
| Bismuth octoate | — | — | — | — | — | — | — |
| Bismuth neodecanoate | 0.46 | 0.41 | 0.48 | 0.30 | 0.36 | 0.09 | 0.04 |
| Butylated hydroxytoluene | 0.31 | 0.77 | 0.90 | 0.57 | 0.67 | 0.16 | 0.07 |
| Propylene diamine | — | — | 15.1 | — | — | — | — |
| Silquest ® A1110 | — | — | — | 11.2 | — | — | — |
| Silquest ® ALink 35 | — | — | — | — | — | 8.4 | — |
| Sodium hydroxide (31%) | — | 46.2 | 53.4 | 33.4 | 40.0 | 9.7 | 4.0 |
| Triethylamine | 37.0 | — | — | — | — | — | — |
| Water | 1283 | 1237 | 2762 | 936 | 1118 | 278 | 107.2 |
| Coatosil ® MP200 | — | — | — | — | — | — | 2.03 |
| Acticide ® MBS | — | — | — | — | — | — | — |

TABLE 3

Dispersions characteristics

| | EX1A | EX1B | EX2A | EX2B | EX3 | EX4 | EX5 | EX6 | EX7 | EX8 | EX9 | EX10 | EX11 | EX12 | EX13 |
|---|---|---|---|---|---|---|---|---|---|---|---|---|---|---|---|
| Ratio OH/NCO, % | 50 | 50 | 50 | N/A | 52 | 55 | 55 | 52 | 55 | 55 | 52 | 55 | 55 | 52 | 52 |
| Solid content (%) | 44.6 | 38.9 | 44.7 | 40.0 | 43.1 | 45.2 | 44.6 | 44.8 | 44.8 | 44.8 | 30.3 | 44.8 | 44.7 | 44.7 | 44.6 |
| Viscosity (mPa · s) | 50 | 41 | 81 | 31 | 282 | 91 | 352 | 149 | 271 | 237 | 19 | 158 | 533 | 189 | 207 |
| pH | 6.5 | 6.6 | 6.8 | 7.7 | 6.7 | 6.6 | 6.6 | 6.7 | 6.7 | 6.8 | 6.7 | 7.0 | 6.7 | 6.6 | 6.6 |
| Particle size (nm) | 125 | 87 | 77 | 74 | 61 | 85 | 48 | 61 | 68 | 76 | 68 | 100 | 53 | 50 | 67 |
| MFFT (° C.) | <0 | <0 | <0 | <0 | <0 | <0 | <0 | <0 | <0 | <0 | <0 | <0 | <0 | <0 | <0 |
| Stability 60° C. (days) | >10 | >10 | >10 | >10 | >48 | >20 | >10 | >10 | >10 | >10 | 3 | >10 | >10 | >10 | 1 |

TABLE 4

Performances measurement

| | EX1A | EX1B | EX2A | EX2B | EX3 | EX4 | EX5 | EX6 |
|---|---|---|---|---|---|---|---|---|
| Creep $\eta_{30}$ (Pa · s) | $3.9 \, 10^2$ | $3.3 \, 10^4$ | $1.2 \, 10^6$ | $1.1 \, 10^7$ | $1.3 \, 10^5$ | $6.2 \, 10^4$ | $3.2 \, 10^6$ | $1.0 \, 10^5$ |
| Tack b/c (Leneta ®) (0-5) | 0 | 2 | 2-3 | 4-5 | 2-3 | 2 | 2-3 | 2-3 |
| DOI (%) (ABS) | 97.9 | 92 | 92.6 | 86.5 | 99.0 | 99.2 | 98.0 | 98.8 |
| Mirror & body (PVC) (1-5) | 5 | 1 | 1-2 | 0 | 3 | 4 | 3 | 3 |

TABLE 4-continued

Performances measurement

|  | EX7 | EX8 | EX9 | EX10 | EX11 | EX12 | EX13 |
|---|---|---|---|---|---|---|---|
| Creep $\eta_{30}$ (Pa · s) | 4.4 $10^4$ | 3.5 $10^4$ | 9.6 $10^5$ | 1.4 $10^6$ | 1.3 $10^6$ | 6.0 $10^5$ | >1.0 $10^9$ |
| Tack b/c (Leneta ®) (0-5) | 2 | 1 | 2 | 2 | 2 | 2 | 2-3 |
| DOI (%) (ABS) | 97.2 | 98.5 | 98.3 | 98.4 | 99.0 | 98.8 | 98.4 |
| Mirror & body (PVC) (1-5) | 4 | 5 | 2 | 3-4 | 4 | 2 | 4 |

TABLE 5

Performances measurement

|  | EX1A | EX1B | EX2A | EX2B | EX3 |
|---|---|---|---|---|---|
| Water release (PVC) (0-5) | 2 | 0-1 | 2 | 0 | 2 |
| Resolubility (1-5) (glass) (24 h) | 4 | 5 | 4 | 3 | 4 |
| Stain, 10% ammonia (Leneta ®) (1-5) | 5 | 4 | 4 | 5 | 4.5 |
| Persoz hardness (glass) (sec) | 262 | 179 | 292 | 264 | 289 |
| Steel wool scratch resistance (PVC) (0-5) | 1 | 0 | 2 | 4-5 | 2 |

The invention claimed is:

1. An aqueous radiation curable composition (I) comprising:
at least one ethylenically unsaturated polyurethane (A) obtained from the reaction of at least one polyisocyanate compound (Ai); at least one ethylenically unsaturated compound (Aii) containing at least one reactive group capable to react with isocyanate groups; at least one hydrophilic compound (Aiii) containing at least one reactive group capable to react with isocyanate groups and at least one other group which is capable to render the polyurethane polymer dispersible in aqueous medium as such or after the formation of a salt; and, optionally, at least one polyol (Aiv); the ethylenically unsaturated polyurethane (A) having a weight average molecular weight of between 1,000 Daltons and 50,000 Daltons;
at least one ethylenically unsaturated polyurethane (B), different from the polyurethane (A), obtained from the reaction of at least one polyisocyanate compound (Bi); at least one ethylenically unsaturated compound (Bii) containing at least one reactive group capable to react with isocyanate groups; and, optionally, at least one polyol (Biv); and
optionally, at least one ethylenically unsaturated compound (C) different from (A) and (B);
with the proviso that if the at least one polyol (Aiv) and/or the at least one polyol (Biv) are used, (Aiv) are saturated polyols and (Biv) can be saturated polyols and/or unsaturated polyols; and
wherein the radiation curable composition (I) in dry form has a steady-state creep viscosity $\eta_{30}$, expressed as the apparent viscosity after a deformation time of 30 minutes with a load $\sigma 0=50$ Pa at 23° C., that is above $1·10^3$ Pa·s,
wherein the polyurethane (B) is non self-dispersible, and wherein the polyurethane (B) is not soluble in water.

2. The radiation curable composition (I) according to claim 1 wherein compounds (Ai) and (Bi) are the same and wherein compounds (Aii) and (Bii) are the same.

3. The radiation curable composition (I) according to claim 1 wherein the polyurethane (A) is further prepared from at least one polyol (Aiv) and/or wherein the polyurethane (B) is further prepared from at least one polyol (Biv).

4. The radiation curable composition (I) according to claim 3 wherein the polyols (Aiv) and (Biv) are selected from saturated polyols.

5. The radiation curable composition (I) according to claim 1 wherein the polyurethane (A) is further prepared from at least one further compound (Av) different from the polyol (Aiv) and comprising at least one reactive group capable to react with isocyanate groups and/or wherein the polyurethane (B) is further prepared from at least one further compound (Bv) different from the polyol (Biv) and comprising at least one reactive group capable to react with isocyanate groups.

6. The radiation curable composition (I) according to claim 5 wherein compounds (Av) and/or compounds (Bv) are amino(polyalkoxy)silanes.

7. The radiation curable composition (I) according to claim 1 wherein the polyurethane (A) is further prepared from at least one reactive electrophilic compound (Avi) and/or wherein the polyurethane (B) is further prepared from at least one reactive electrophilic compound (Bvi).

8. The radiation curable composition (I) according to claim 7 wherein the reactive electrophilic compound (Avi) and/or (Bvi) are selected from gamma-glycidoxypropyltrimethoxysilane, gammaglycidoxypropyltriethoxysilane, gamma-isocyanatopropyltrimethoxysilane and/or gammaisocyanatopropyltriethoxysilane.

9. The radiation curable composition (I) according to claim 1 wherein the polyurethane (A) contains poly(alkoxysilane) groups.

10. The radiation curable composition (I) according to claim 1 wherein the polyurethanes (A) and/or (B) contain at least one function selected from allophanate, urea and/or biuret functions.

11. The radiation curable composition (I) according to claim 1 wherein the compounds (C) are selected from polyester acrylates, polycarbonate acrylates, polyether acrylates, polyepoxy acrylates, polyacrylic acrylates and/or polysiloxane acrylates.

12. The radiation curable composition (I) according to claim 1 wherein the polyurethanes (A) are characterized by a weight average molecular weight of between 2,500 Daltons and 25,000 Daltons.

13. The radiation curable composition (I) according to claim 1 comprising, relative to the total weight of compounds (A), (B), and (C), from 10 to 97.5 wt % of compounds (A), from 2.5 to 50 wt % of compounds (B), and from 0 to 40 wt % of compounds (C).

14. The radiation curable composition (I) according to claim 1 characterized by a solid content of between 30 and 50 wt %.

15. The radiation curable composition (I) according to claim 1 characterized by an insoluble fraction above 5 wt %, as measured gravimetrically after drying of the aqueous radiation curable composition (I) for 4 hours at 23° C. and 2 hours at 80° C., followed by 24 hours immersion in tetrahydrofuran at 23° C. and drying of the gelled composition (I) for 1 hour at 110° C.

16. A process for preparing an aqueous radiation curable composition (I) according to claim 1 comprising:
- first step comprising the reaction of at least one compound (Ai) with at least one compound (Aii) in such a stoichiometry that there is an excess of isocyanate groups over the reactive group capable to react with isocyanate groups and that a mixture of an ethylenically unsaturated polyurethane (B) is formed in situ together with an isocyanate-containing precursor of the ethylenically unsaturated polyurethane (A);
- a second step comprising the reaction of the isocyanate-containing precursor obtained in step 1 with at least one compound (Aiii) and, optionally, at least one polyol (Aiv) and/or at least one compound (Av) in such a stoichiometry that there is still an optional excess of isocyanate groups;
- an optional third step comprising the conversion of the optional excess of isocyanate groups from step 2 into allophanates and/or biurets;
- an optional fourth step comprising the reaction of the polyurethane thus obtained with at least one compound (Avi);
- an optional fifth step comprising the reaction with a neutralizing agent in order to convert at least part of the hydrophilic groups provided by compound (Aiii) into ionic salts;
- a sixth step comprising the dispersion in an aqueous medium of the polyurethane thus obtained; and
- an optional further step comprising the reaction of the polyurethane thus obtained with at least one compound (Av).

17. The process according to claim 16 wherein, in the first step the equivalent ratio of isocyanatereactive groups provided by compounds (Aii) to isocyanate groups provided by compounds (Ai) is above 50%.

18. An article or substrate coated, printed or treated, either partially or entirely, with a composition according to claim 1.

19. The radiation curable composition (I) according to claim 1 wherein the at least one ethylenically unsaturated polyurethane (B) has a weight average molecular weight that is below 10,000 Daltons.

20. The radiation curable composition (I) according to claim 1 wherein the at least one ethylenically unsaturated compound (C) has a weight average molecular weight below 2,500 Daltons.

\* \* \* \* \*